US012591507B2

(12) United States Patent
Busam et al.

(10) Patent No.: US 12,591,507 B2
(45) Date of Patent: Mar. 31, 2026

(54) MODEL LIFECYCLE MANAGEMENT

(71) Applicant: Wells Fargo Bank, N.A., San Francisco, CA (US)

(72) Inventors: Kamalakar Busam, Waxhaw, NC (US); Rohit Chandramohan, West Windsor, NJ (US); Shrikant Khaire, Charlotte, NC (US); Indira Korrapati, Charlotte, NC (US); Reuben Mathew, Lewisville, TX (US); Kedharnath Parameswaran, Morganville, NJ (US); Bharat Vishnuprasad Patel, Hillsborough, NJ (US); Ramachandhran Ganapathi Subrahmanian, East Windsor, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 284 days.

(21) Appl. No.: 18/329,382

(22) Filed: Jun. 5, 2023

(65) Prior Publication Data
US 2024/0403798 A1 Dec. 5, 2024

(51) Int. Cl.
*G06F 11/3698* (2025.01)
*G06F 8/71* (2018.01)
(Continued)

(52) U.S. Cl.
CPC ............ *G06F 11/3698* (2025.01); *G06F 8/71* (2013.01); *G06F 11/3684* (2013.01);
(Continued)

(58) Field of Classification Search
CPC .............. G06Q 10/067; G06F 11/3688; G06F 11/3684; G06F 8/71; G06F 11/3698; G06F 11/3692
See application file for complete search history.

(56) References Cited

U.S. PATENT DOCUMENTS

| | | | |
|---|---|---|---|
| 7,162,427 | B1 | 1/2007 | Myrick et al. |
| 9,842,045 | B2 | 12/2017 | Heorhiadi et al. |

(Continued)

OTHER PUBLICATIONS

Waseem, Muhammad et al., "Decision Models for Selecting Patterns and Strategies in Microservices Systems and their Evaluation by Practitioners," 2022 IEEE/ACM 44th International Conference on Software Engineering: Software Engineering in Practice (ICSE-SEIP), Date of Conference: May 22-24, 2022, INSPEC Accession No. 21797898, DOI: 10.1145/3510457.3513079, 4 pages.

(Continued)

*Primary Examiner* — Charles Guiliano
(74) *Attorney, Agent, or Firm* — Merchant & Gould P.C.

(57) ABSTRACT

An example computer system for implementing a lifecycle of a model can include: one or more processors; and non-transitory computer-readable storage media encoding instructions which, when executed by the one or more processors, causes the computer system to create: an orchestration service programmed to create a workflow for model execution; and a registration service programmed to provide governance for the workflow; wherein the orchestration service and the registration service are microservices, and the microservices communicate programmatically to facilitate the model execution.

10 Claims, 5 Drawing Sheets

(51) Int. Cl.
    *G06F 11/3668*        (2025.01)
    *G06Q 10/067*        (2023.01)

(52) U.S. Cl.
    CPC ...... *G06F 11/3688* (2013.01); *G06F 11/3692* (2013.01); *G06Q 10/067* (2013.01)

(56)             References Cited

U.S. PATENT DOCUMENTS

| | | |
|---|---|---|
| 10,230,571 B2 | 3/2019 | Rangasamy et al. |
| 10,755,344 B2 | 8/2020 | Mohammad et al. |
| 11,057,393 B2 | 7/2021 | Coffing |
| 2004/0162741 A1 | 8/2004 | Flaxer et al. |
| 2012/0150548 A1 | 6/2012 | Rajagopalan et al. |
| 2017/0187785 A1 | 6/2017 | Johnson et al. |
| 2021/0224900 A1 | 7/2021 | Lin et al. |
| 2021/0397585 A1* | 12/2021 | Seward ................. G06F 16/176 |
| 2022/0269590 A1 | 8/2022 | Hartwell et al. |
| 2023/0014438 A1* | 1/2023 | Jones ........................ G06F 8/77 |
| 2024/0095149 A1* | 3/2024 | Hegadi .............. G06F 11/3688 |

OTHER PUBLICATIONS

U.S. Appl. No. 17/308,478, filed May 5, 2021.
U.S. Appl. No. 17/809,147, filed Jun. 27, 2022.
U.S. Appl. No. 18/155,837, filed Jan. 18, 2023.

* cited by examiner

Figure 2:
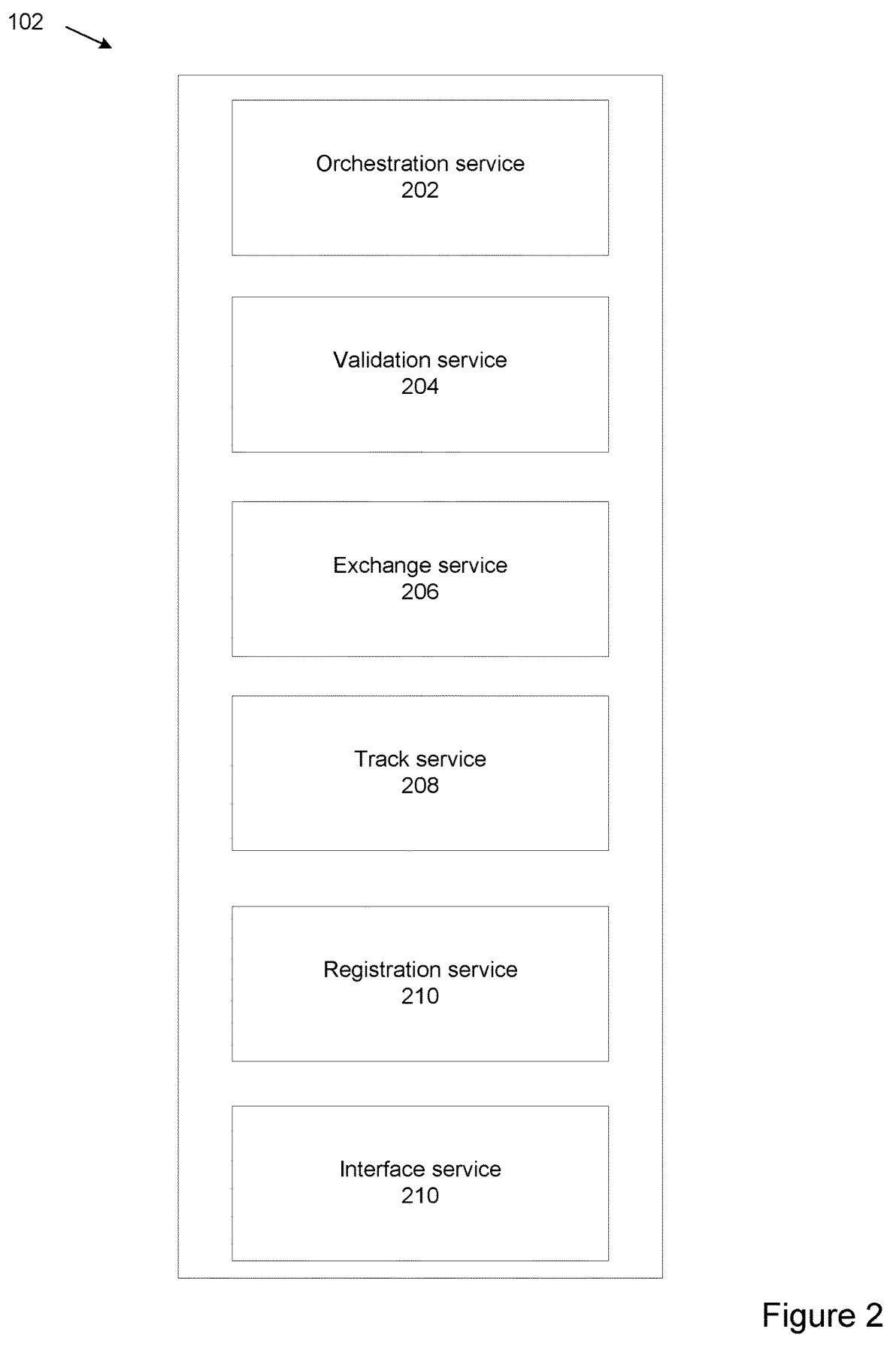

102

Orchestration service
202

Validation service
204

Exchange service
206

Track service
208

Registration service
210

Interface service
210

MODEL LIFECYCLE MANAGEMENT

BACKGROUND

Business enterprises use computer modeling to predict outcomes based on large quantities of data. The predicted outcomes can be used to create and modify products and services for customers, to communicate with customers and other parties, and so forth. Typically, large enterprises, such as financial institutions, create, train, test, score and monitor many models for many projects.

Before a new model or a new version of a model can be placed into production and thereby relied upon by a business enterprise to generate output relevant to the enterprise's business, the model must be configured such that it can be deployed in the enterprise's computing production environment. It can be difficult to manage all the models in in a cohesive and efficient manner.

SUMMARY

Examples provided herein are directed to a microservices-based framework that supports a model lifecycle.

According to one aspect, an example computer system for implementing a lifecycle of a model can include: one or more processors; and non-transitory computer-readable storage media encoding instructions which, when executed by the one or more processors, causes the computer system to create: an orchestration service programmed to create a workflow for model generation; and a registration service programmed to provide governance for the workflow; wherein the orchestration service and the registration service are microservices, and the microservices communicate programmatically to facilitate the model generation.

According to another aspect, an example method for implementing a lifecycle of a model can include: create a workflow for model generation; and providing governance for the workflow; wherein the workflow and the governance are embedded in microservices, and the microservices communicate programmatically to facilitate the model performance monitoring.

The details of one or more techniques are set forth in the accompanying drawings and the description below. Other features, objects, and advantages of these techniques will be apparent from the description, drawings, and claims.

DESCRIPTION OF THE DRAWINGS

FIG. 2 shows example logical components of a server device of the system of FIG. 1.

DETAILED DESCRIPTION

This disclosure relates to a microservices-based framework that supports a model lifecycle.

Business enterprises, such as financial institutions, utilize computer models to predict outcomes. Typically, in order for an enterprise to develop, test and run a model, the model must be onboarded to a computing environment generated and managed by the enterprise.

Onboarding a model to a computing environment of an enterprise can be a highly time-consuming process. Deploying a model in an enterprise's production environment can be especially complex and time consuming process. Each model, and each job of each model, typically must be reconfigured to be compatible with the hardware, firmware, middleware and software of the production environment of the enterprise.

Various systems exist for the creation and deployment of models within an environment of an enterprise. For instance, U.S. patent application Ser. No. 17/308,478 filed on May 5, 2021, which is incorporated herein, discloses a system for configuring models in an efficient manner for deployment and production use by a business enterprise. Further, U.S. patent application Ser. No. 17/809,147 filed on Jun. 27, 2022, which is incorporated herein, discloses a system for the automation and orchestration of models, including the creation workstreams, which involve constructing the execution of a model or a series of models in a user interface.

The example microservices-based framework disclosed herein can support a model lifecycle from discovery, implementation, validation and deployment on multiple distributed systems. Self-service and interconnected services can be provided for the various users who are responsible for the creation and deployment of these models. Such users include model developers like software engineers, data scientists, business analysts, and validation/governance teams to collaboratively market new models to solve business problems. The concept enables the various aspects of model development and deployment (e.g., modeling, validation, governance) to be implemented as services that are accessible through application programming interface (API) calls.

There can be various advantages associated with the framework described herein. For instance, the framework can exhibit the practical application of allowing model creation and deployment to be conducted in a more efficient and consistent manner. This results in a more robust system with fewer errors and downtime due to modeling inefficiencies. Further, the framework can exhibit the practical application of providing a more efficient interface with which to interact when developing and deploying models. This interface exhibits an ordered combination of elements that is more efficient at presenting and receiving data. Many other advantages are possible.

Figure 1:
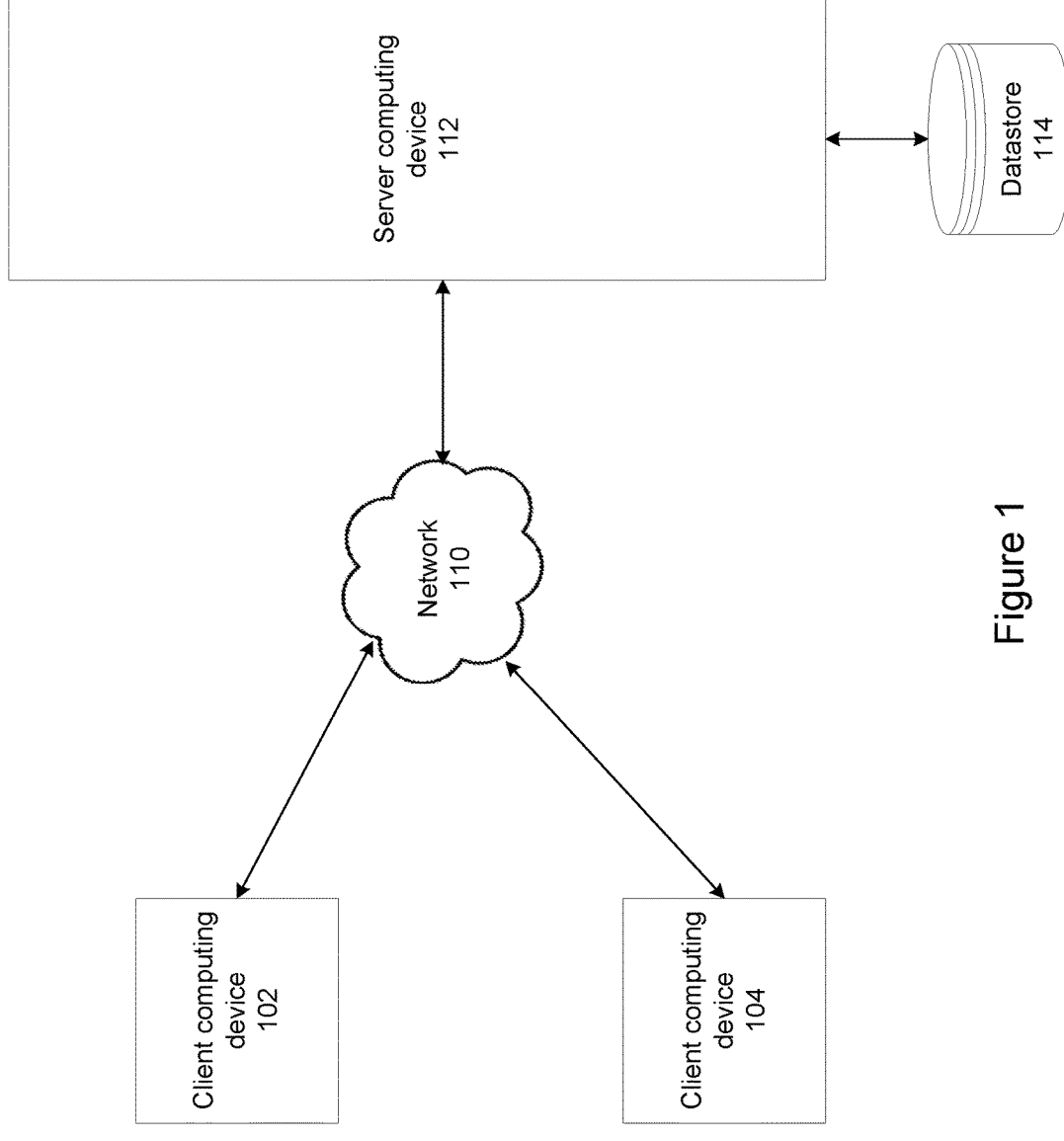
FIG. 1 shows an example system for supporting a model lifecycle.

FIG. 1 schematically shows aspects of one example system 100 programmed to provide the microservices-based framework that supports a model lifecycle. In this example, the system 100 can include a plurality of client and server devices.

In this instance, the system 100 includes client computing devices 102, 104 and a server computing device 112. The computing devices 102, 104 and the server computing device 112 can communicate through a network 110 to accomplish the functionality described herein. A datastore 114 can be provided for the server computing device 112.

Each of the devices may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server computing device 112 is owned by a financial institution, such as a bank. The example client computing devices 102, 104 are programmed to communicate with the server computing device 112 to access business applications and/or data associated with the system 100. For instance, the client computing devices 102, 104 can access the server computing device 112 to create and manipulate models used by the financial institution of the system 100, such as the framework described herein.

The example datastore 114 is programmed to store information about the system 100. In this example, the datastore 114 stores information about the models created and implemented by the system 100.

The network 110 provides a wired and/or wireless connection between the client computing devices 102, 104 and the server computing device 112. In some examples, the network 110 can be a local area network, a wide area network, the Internet, or a mixture thereof. Many different communication protocols can be used.

Although only a few devices are shown, the system 100 can accommodate hundreds or thousands of computing devices. For instance, it is likely that there are hundreds or thousands of client computing devices. Further, the server computing device 112 can include hundreds or thousands of computing devices that provide reliable data access in accordance with industry standards. Many configurations are possible.

Referring now to FIG. 2, additional details of the server computing device 112 are shown. In this example, the server computing device 112 has various logical modules that can be programmed to provide the functionality described herein, including creation of the framework that facilitates the model lifecycle. The framework can be modular so that different users are provided with the tools necessary for their specific implementation of the lifecycle.

In the examples provided herein, the framework provided by the server computing device 112 allows for models to be tracked throughout the lifecycle from creation to deployment. This includes actions provided by developers, validator, deployers, etc. Each step can be traceable and auditable.

Development of each model can be isolated within a development sandbox. For instance, in one implementation, Google Colab from Google LLC is used to provide for the writing and execution of scripting, such as Python. This can allow for more rapid creation and deployment of the model lifecycle. Storage space can be segregated for each model and drive a user interface to allow for more efficient creation and validation of the model, as described further below. Many other configurations are possible.

Further, the various steps of the lifecycle can be automated, utilizing a microservices-based publish/subscribe system, such as Kafka events. The framework can be automated and minimize the duplication of data. The server computing device 112 can provide validation and governance functionality for each of the models throughout the lifecycle, allowing implementation of a model to be independently verifiable.

As noted, the example framework provided by the server computing device 112 is service-based and utilizes micro frontend services to implement various functionality. Each of the services is callable and can be API-driven.

To implement this framework, the example server computing device 112 can include one or more of an orchestration service 202, a validation service 204, an exchange service 206, a track service 208, a registration service 210, and/or an interface service 212. In other examples, more or fewer logical modules can be provided.

Each of the example services of the server computing device 112 can be implemented as a micro frontend service with an API endpoint. This allows each of the services to be readily accessible and enhances the efficiency of the system 100.

The example orchestration service 202 is programmed to coordinate the execution of models. In some examples, the orchestration service 202 allows for the scheduling of jobs associated with the model lifecycle, such as data moves, ad hoc and/or scheduled model runs, periodic monitoring, validation testing, report generation, etc.

In some instances, the orchestration service 202 can be programmed to generate customer workflows. This allows for the stitching together of various aspects of model generation. In addition, the orchestration service 202 can be programmed for model execution provide a user interface that allows for dragging and dropping of features to build dependencies associated with a workflow. A tool, such as the Apache Airflow workflow management platform from Apache Software Foundation, can be used to accomplish this functionality. One such interface is provided in FIG. 3, described further below.

The example validation service 204 is programmed to register a suite of validation techniques. The validation service 204 can provide both on-demand and scheduled validations of models. Further, the validation service 204 can allow for isolation during validation, such as by providing isolated containers and remove model execution.

In one embodiment, the validation service 204 is programmed to provide a sandbox as a model validation group. The sandbox is segregated from the remainder of the system 100, and the validation service 204 can provide a set of predefined model validations, which can be implemented and deployed on the models of the system 100.

The validation service 204 can allow for validation to be executed through an API. The validation service 204 can also allow for the capture of a particular set of validation techniques that are saved and executed as desired on future models. Many other configurations are possible.

The example exchange service 206 is programmed to assist in reducing data duplication and movement. The exchange service 206 can be programmed to manage data that is imported into and exported out of the system 100. For instance, the exchange service 206 can discover data in the datastore 114 and identify duplicative data based upon different data attributes, thereby reducing duplication.

The exchange service 206 can also be programmed to provide auditing and traceability for this data. Further, the exchange service 206 can be programmed to automatically scan the data to determine attributes, such as personal identifiable information, and thereby treat the data appropriately.

Once data has been identified, the exchange service 206 can be programmed to manage the data. For instance, the exchange service 206 can catalog the data, using metadata to track the data and provide services like the deduplication. Such data can be stored in the datastore 114 in various formats, such as flat files (e.g., CSV) or through big data store formats like Hadoop and Hive.

The example track service 208 is programmed to provide model telemetry for ongoing automated monitoring of the model lifecycle. The model telemetry can allow for batch and forecasting models. Further, the track service 208 can provide open telemetry to include additional information to monitor model outputs. For instance, the track service 208 can collect model performance information during testing, validation, and deployment.

The example registration service 210 is programmed to register deployed models on the system 100. The registration service 210 can manage and organize model documentation and changelog information. The registration service 210 can also provide data and model dependencies across the system 100. The registration service 210 can further provide notifications when model metadata changes.

Finally, the registration service 210 can also be programmed to communicate validation, compliance, and governance aspects. As described further below, these validation, compliance, and governance considerations can be addressed programmatically through the micro frontend services and APIs provided by the system 100. U.S. patent application Ser. No. 18/155,837 filed on Jan. 18, 2023, which is incorporated herein, discloses an artificial-intelligence-based governance, risk and compliance system that integrates multiple, changing and unstructured data sources, performs analysis and correlation on the data, and/or is capable of providing a real time, holistic, end to end view of enterprise risk intelligence and current regulatory compliance adherence posture.

The example interface service 212 is programmed to provide an interface for the server computing device 112 that drives the functionality described herein. In some examples, the interface service 212 is programmed to provide a common abstract interface for all models. The interface service 212 further provides an interface with APIs that are used to execute models, as provided in more detail below. Finally, the interface service 212 can provide a repository for model experiment tracking, tagging and logging using the datastore 114.

Figure 3:
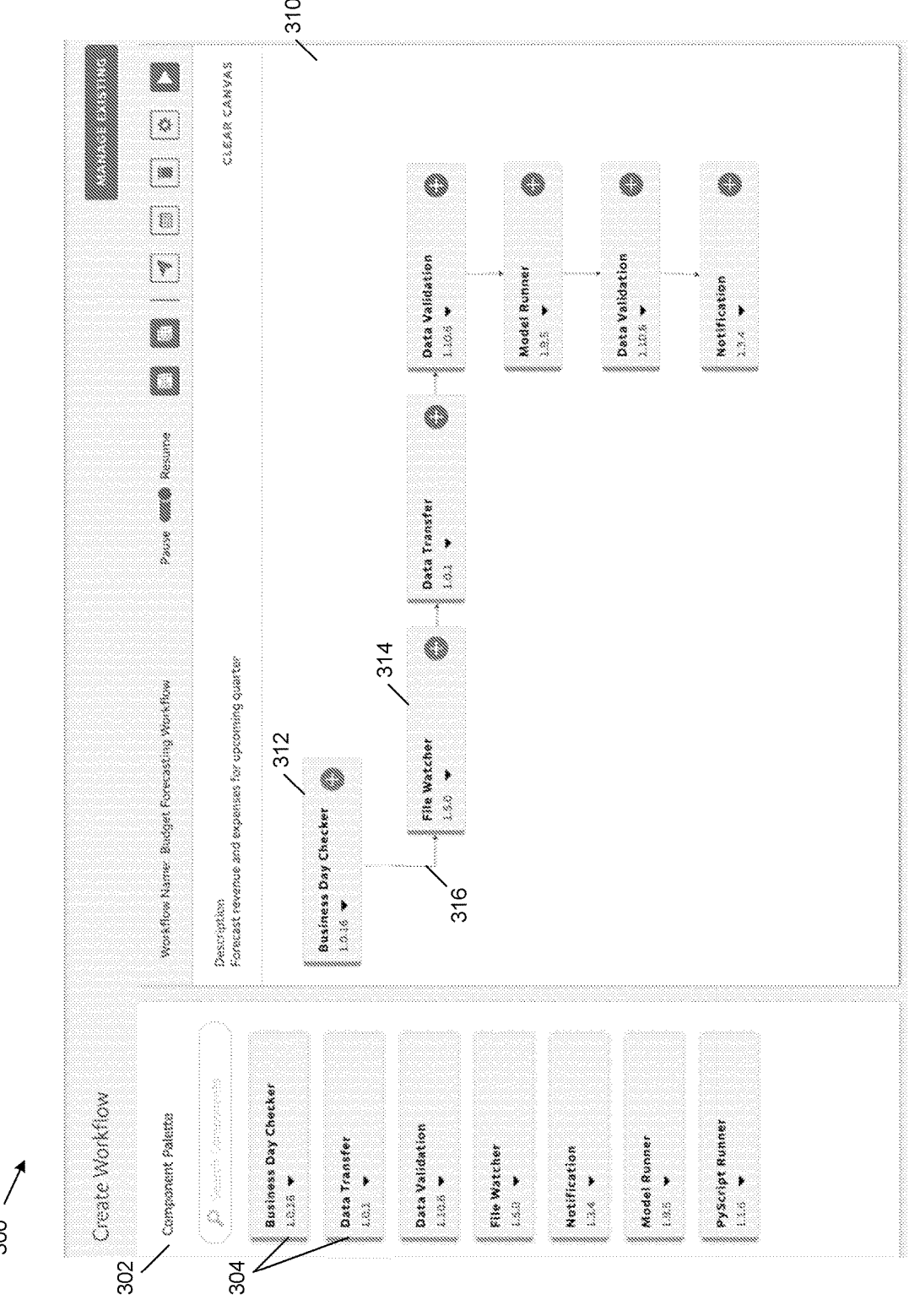
FIG. 3 shows an example user interface of the server device of FIG. 2.

For instance, the interface service 212 is programmed to generate one or more user interfaces, such as an interface 300 as provided in FIG. 3. The interface 300 can be rendered on the client computing devices 102, 104 to allow for the creation of a workflow utilizing one or more models from the server computing device 112.

In this example, the interface 300 includes a component palette 302 listing a plurality of components that can be used in the workflow. In this example, the component palette 302 lists a plurality of models 304 that are available for use in the workflow. These models 304 can be selected for use in the workflow.

The interface 300 also includes a canvas 310 upon which the models 304 can be placed for use in the workflow. In this example, the models 304 are draggable from the component palette 302 to the canvas 310 for placement in the workflow. As the workflow is built, each desired model is placed on the canvas 310 at the desired location within the workflow and linked together.

For instance, in this embodiment, a model 312 and a model 314 have been dragged from the component palette 302 and placed on the canvas 310 at the desired locations. Further, the model 312 has been connected to the model 314 by a connector 316. The connector 316 indicates the workflow starts with the model 312, and the output of the model 312 is provided to the model 314.

The remainder of the workflow is built-out on the canvas 310 in a similar fashion. Since each of the models is implemented as a micro frontend service, the workflow is constructed as a series of API calls between each of the models in the workflow. Many other configurations are possible.

Figure 4:
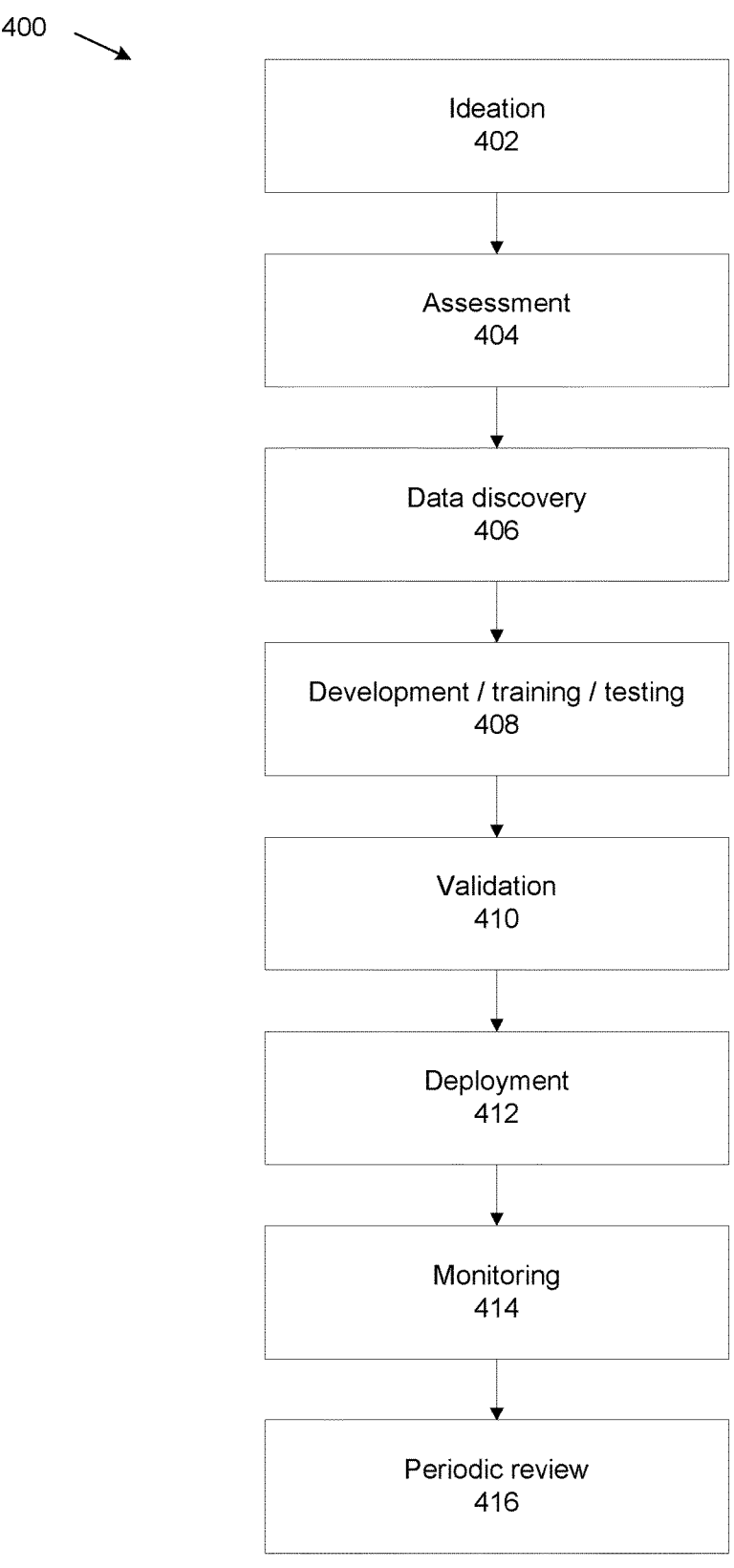
FIG. 4 shows an example method performed by the server device of FIG. 2.

Referring now to FIG. 4, an example method 400 for implementing a lifecycle of a model is shown. The method 400 can be implemented by the server computing device 112 of the system 100 described above.

The method 400 includes various steps that provide the functionality described herein. This allows for the programmatic implementation of governance and compliance standards in the API-driven environment of the system 100. The method 400 also allows for reduced data movement and ongoing monitoring using model telemetry. Finally, the method 400 can provide for automated deployments and reduced development and implementation times.

At operation 402, the construct for the model is created. This model construct can be driven by various business considerations and define the model requirements. Next, at operation 404, an assessment of the model construct can be done for various attributes, such as compliance with regulations and governance.

Next, at operation 406, the data needed for the model is identified, and development, training, and testing of the model are performed at operation 408. At operation 410, validation of the model is performed, and the model is deployed at operation 412. Finally, the model is monitored at operation 414 and periodically reviewed at operation 416.

Operations 404, 410, and 416 all relate to governance and compliance for the model. As noted, a significant advantage of this method 400 is that these operations can be performed as services that access information through APIs as the method 400 is implemented by the system 100.

For instance, as the model construct is developed at operation 402, the assessment at operation 404 can automatically be conducted by accessing the model construct information directly through an API as a microservice. This can occur automatically and does not require the model developer to provide the information manually, nor does the governance assessment need to request the information manually.

Similarly, as the validation occurs at operation 410, the development, training, and testing information from the operation 408 is programmatically provided for validation through another API. Finally, the periodic review at operation 416 is conducted through API calls that access the information associated with the monitoring at operation 414. This configuration provides a more efficient and robust process throughout the lifecycle of the model.

Figure 5:
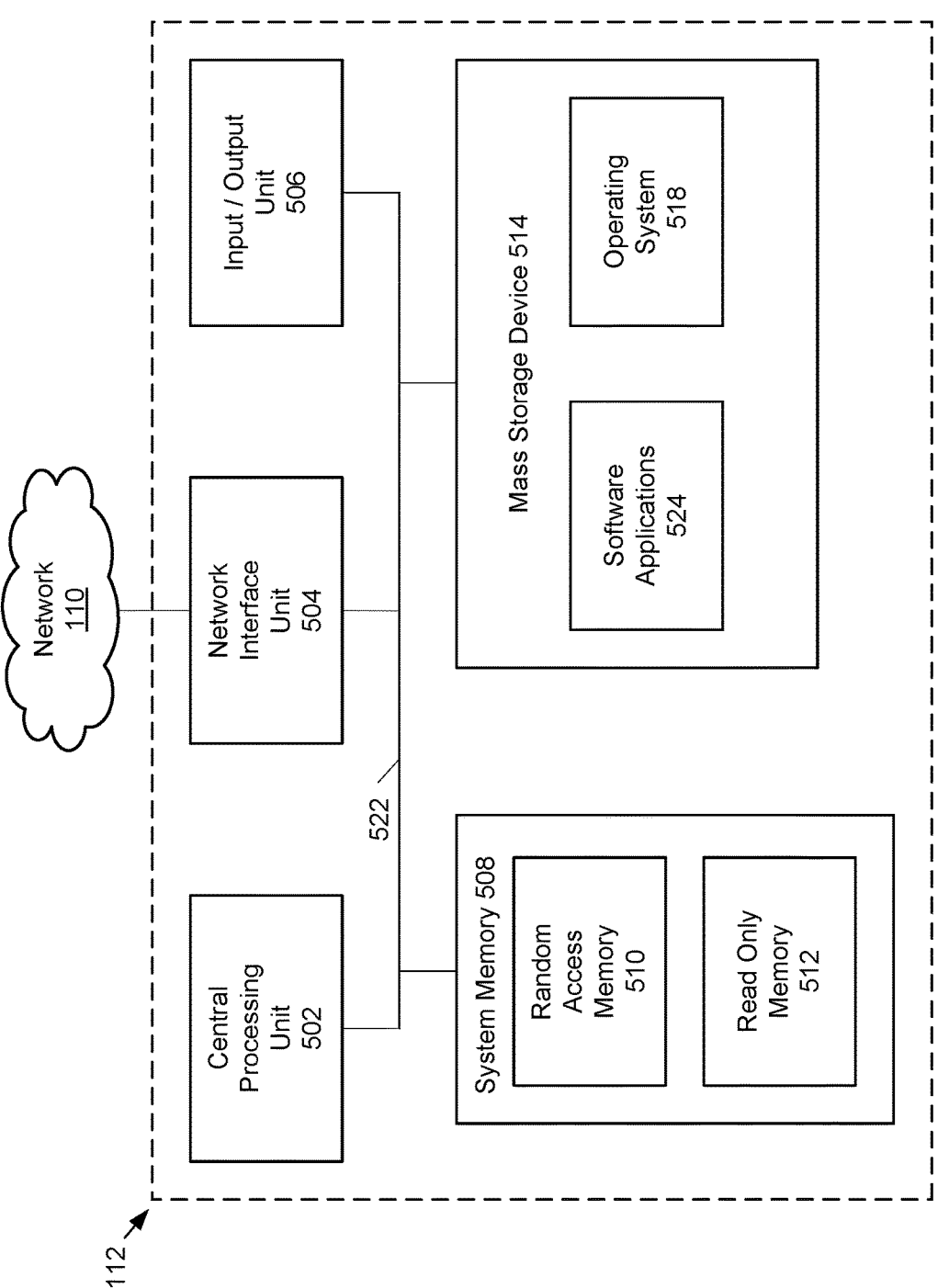
FIG. 5 shows example physical components of the server device of FIG. 2.

As illustrated in the embodiment of FIG. 5, the example server computing device 112, which provides the functionality described herein, can include at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system containing the basic routines that help transfer information between elements within the server computing device 112, such as during startup, is stored in the ROM 512. The server computing device 112 further includes a mass storage device 514. The mass storage device 514 can store software instructions and data. A central processing unit, system memory, and mass storage device similar to that shown can also be included in the other computing devices disclosed herein.

The mass storage device 514 is connected to the CPU 502 through a mass storage controller (not shown) connected to the system bus 522. The mass storage device 514 and its associated computer-readable data storage media provide non-volatile, non-transitory storage for the server computing device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computing device 112.

According to various embodiments of the invention, the server computing device 112 may operate in a networked environment using logical connections to remote network devices through network 110, such as a wireless network, the Internet, or another type of network. The server computing device 112 may connect to network 110 through a network interface unit 504 connected to the system bus 522. It should be appreciated that the network interface unit 504 may also be utilized to connect to other types of networks and remote computing systems. The server computing device 112 also includes an input/output controller 506 for receiving and processing input from a number of other devices, including a touch user interface display screen or another type of input device. Similarly, the input/output controller 506 may provide output to a touch user interface display screen or other output devices.

As mentioned briefly above, the mass storage device 514 and the RAM 510 of the server computing device 112 can store software instructions and data. The software instructions include an operating system 518 suitable for controlling the operation of the server computing device 112. The mass storage device 514 and/or the RAM 510 also store software instructions and applications 524, that when executed by the CPU 502, cause the server computing device 112 to provide the functionality of the server computing device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for implementing a lifecycle of a model, comprising:

one or more processors; and non-transitory computer-readable storage media encoding instructions which, when executed by the one or more processors, causes the computer system to create:

an orchestration service programmed to create a workflow for model execution;

a registration service programmed to provide governance for the workflow, wherein the registration service is further programmed to register deployed models on the computer system and provide data and model dependencies across the computer system;

a validation service programmed to provide a sandbox for model generation, wherein the sandbox is segregated from a remainder of the computer system and allows for isolation during validation of the model, wherein the sandbox provides for execution of scripting to allow for creation and deployment of the lifecycle of the model, and wherein the validation service provides isolated containers and remote model execution for the isolation during validation; and an interface service programmed to:

function as a model-as-a-service through an application programming interface, wherein the interface service provides a common abstract interface for models, and wherein the interface service allows for external systems to make requests for the model execution and receive outputs from the model execution through the application programming interface; and provide an interface upon which the workflow is developed, wherein the interface includes a component palette listing a plurality of components, and a canvas upon which one or more of the plurality of components is arrangeable to create the workflow, and wherein the one or more of the plurality of components is draggable from the component palette to the canvas to create the workflow;

wherein the orchestration service, the registration service, the validation service, and the interface service are microservices, and the microservices communicate programmatically to facilitate the model execution.

2. The computer system of claim 1, wherein each of the orchestration service and the registration service is further programmed to publish events in a publish/subscribe system.

3. The computer system of claim 1, comprising further instructions which, when executed by the one or more processors, causes the computer system to create an exchange service programmed to provide auditing and traceability for the model.

4. The computer system of claim 1, comprising further instructions which, when executed by the one or more processors, causes the computer system to create a track service programmed to provide model telemetry to allow for monitoring of the model.

5. The computer system of claim 1, wherein the registration service is further programmed to manage documentation and changelog information for the model.

6. A method for implementing a lifecycle of a model, the method comprising:

creating a workflow for model execution;

providing governance for the workflow, including registering deployed models on a computer system and providing data and model dependencies across the computer system; and providing a sandbox for model generation, wherein the sandbox is segregated from a remainder of the computer system and allows for isolation during validation of the model, wherein the sandbox provides for execution of scripting to allow for creation and deployment of the lifecycle of the model, and wherein isolated containers and remote model execution are provided for the isolation during validation;

providing an interface service programmed to:

function as a model-as-a-service through an application programming interface, wherein the interface service provides a common abstract interface for models, and wherein the interface service allows for external systems to make requests for the model execution and receive outputs from the model execution through the application programming interface; and provide an interface upon which the workflow is developed, wherein the interface includes a component palette listing a plurality of components, and a canvas upon which one or more of the plurality of components is arrangeable to create the workflow, and wherein the one or more of the plurality of components is draggable from the component palette to the canvas to create the workflow;

wherein the workflow, the governance, and the interface are embedded in microservices, and the microservices communicate programmatically to facilitate the model execution.

7. The method of claim 6, further comprising publishing events in a publish/subscribe system for the microservices.

8. The method of claim 6, further comprising providing auditing and traceability for the model.

9. The method of claim 6, further comprising providing model telemetry to allow for monitoring of the model.

10. The method of claim 6, further comprising managing documentation and changelog information for the model.

* * * * *